United States Patent
Henmi et al.

(10) Patent No.: US 6,299,854 B1
(45) Date of Patent: Oct. 9, 2001

(54) METHOD OF PRODUCING ARTIFICIAL ZEOLITE

(76) Inventors: Teruo Henmi, 645-20, Kishimachi, Matsuyama-shi, Ehime 791-1102 (JP); Etsuro Sakagami, 6-11-14, Minami-naruse, Machida-shi, Tokyo 194-0045 (JP)

(*) Notice: Subject to any disclaimer, the term of this patent is extended or adjusted under 35 U.S.C. 154(b) by 0 days.

(21) Appl. No.: 09/329,226

(22) Filed: Jun. 10, 1999

(30) Foreign Application Priority Data

Jun. 12, 1998 (JP) .................................................. 10-164540
Nov. 26, 1998 (JP) .................................................. 10-335699

(51) Int. Cl.$^7$ .................................................. C01B 39/02
(52) U.S. Cl. .......................................... 423/700; 423/712
(58) Field of Search ..................................... 423/700, 712

(56) References Cited

U.S. PATENT DOCUMENTS

| | | | |
|---|---|---|---|
| 3,694,152 | * | 9/1972 | Sersale et al. ........................ 423/712 |
| 3,714,366 | * | 1/1973 | Fukuda et al. ........................ 423/712 |
| 3,758,539 | * | 9/1973 | Flank .................... 423/712 |
| 3,966,883 | * | 6/1976 | Vaughan et al. . |
| 4,661,291 | * | 4/1987 | Yamasaki et al. . |
| 4,935,217 | * | 6/1990 | Simpson ...................... 423/DIG. 25 |
| 5,976,244 | * | 11/1999 | Mallow ................... 423/700 |

FOREIGN PATENT DOCUMENTS

| | | | |
|---|---|---|---|
| 2408989 | * | 8/1974 | (DE) . |
| 39 23 462 | * | 1/1991 | (DE) . |
| 56-149313 | | 11/1981 | (JP) . |
| 64-24014 | | 1/1989 | (JP) . |
| 2-229709 | | 9/1990 | (JP) . |
| 3-45512 | | 2/1991 | (JP) . |
| 3-252310 | | 11/1991 | (JP) . |
| 04-012015 | * | 1/1992 | (JP) . |
| 05155611 | | 6/1993 | (JP) . |
| 5-221628 | | 8/1993 | (JP) . |
| 6-64916 | | 3/1994 | (JP) . |
| 6-092624 | | 4/1994 | (JP) . |
| 6-239612 | | 8/1994 | (JP) . |
| 7-17757 | | 1/1995 | (JP) . |
| 7-196315 | | 8/1995 | (JP) . |
| 8-109015 | | 4/1996 | (JP) . |
| 10-296205 | | 11/1998 | (JP) . |
| 11-236212 | | 8/1999 | (JP) . |
| 712387 | * | 1/1980 | (SU) . |
| 1407904 | * | 7/1988 | (SU) . |
| 1432005 | * | 10/1988 | (SU) . |

OTHER PUBLICATIONS

Ragimiv et al., "Preparation and Properties of New Zeolite L–D", Inorg. Mater., vol. 14, No. 7, pp. 1045–1047, Dec. 1978.*

Lewis, Hawley's Condensed Chemical Dictionary, pp. 365–366 & 1035, 1993.*

Summary of a thesis written by a present inventor in 1989. pp. 143–149. (English translation of Summary only). (No month).

Relevant portion of a thesis written by a present inventor in 1994. pp. 53–70 (w/English translation). (no month).

* cited by examiner

Primary Examiner—David R Sample
(74) Attorney, Agent, or Firm—Armstrong, Westerman, Hattori, McLeland & Naughton, LLP

(57) ABSTRACT

The topic of the present invention is the development of a method of producing inexpensive artificial zeolite of the desired quality employing unused resources, such as descended pyroclastic materials, incineration ash, glass waste, diatomaceous earth waste, aluminum dross, etc., as the starting materials. The present invention is a method whereby artificial zeolite is produced by heat treatment in the presence of water and alkali of an inorganic component comprising silicic acid or aluminum, or a mixture that has been obtained by adding glass, diatomaceous earth and aluminum dross, etc., to an inorganic component comprising silicic acid or aluminum. It is preferred that the alkali is sodium hydroxide or potassium hydroxide, the water and alkali are an aqueous alkali solution, the concentration of this aqueous alkali solution is 2 to 4 N, and heat treatment exceeds 100° C.

9 Claims, 1 Drawing Sheet

METHOD OF PRODUCING ARTIFICIAL
ZEOLITE

BACKGROUND OF THE INVENTION

1. Field of the Invention

The present invention pertains to a method of producing artificial zeolite by heat treatment in the presence of water and an alkali of an inorganic component comprising silicic acid and aluminum, as well as a method of producing artificial zeolite by heat treatment in the presence of water and an alkali of a mixture that has been obtained by adding at least 1 or 2 or more of glass, diatomaceous earth and aluminum dross to an inorganic component comprising silicic acid and aluminum.

2. Description of the Related Art

In the past coal ash, particularly combustion ash or so-called fly ash, the fine powder that is produced when coal is burned by thermal power plants, etc., has been used as the starting material for artificial zeolite. This artificial zeolite has been produced by adding an aqueous 2 to 4 N alkali solution to the starting material and heat treating the product under atmospheric pressure. Therefore, the quality of the artificial zeolite that had been produced depended on the composition of the coal used as the starting material, and there were also limits in terms of this quality.

Moreover, synthesis of zeolite used for catalysts, which is called synthetic zeolite, is accomplished by performing a reaction at a high temperature of 100° C. or higher. In addition, since the production of zeolite is impeded if high-purity starting materials, including silicic acid and aluminum, are not used, starting materials of a low purity cannot be employed.

On the other hand, volcanic ejecta, such as effusive rock, volcanic ash, pumice, volcanic glass, etc., that is found around volcanoes cannot be used as an industrial starting material or on farmland and methods of using this volcanic ejecta pose problems in terms of efficient use of land.

Moreover, trash is being separated for disposal into several different types of trash and collected by municipalities throughout Japan. For example, this trash can be classified as trash that will burn, trash that will not burn, coarse trash, toxic trash, etc., and this classification method varies with the municipality. Of these, trash that will burn is generally incinerated in an incinerator, but treatment of the incineration ash becomes a problem. Moreover, of the trash that will not burn, some of the glass, metal, and synthetic resin is recycled, but treatment of synthetic resin products, including glass bottles, etc., metal cans, etc., synthetic resin trays, pet bottles, etc., is a problem.

Today the amount of waste discarded throughout Japan exceeds 50,000,000 tons and of this, approximately 85% is treated by incineration, crushing, recycling, etc. However, the amount of trash being reclaimed, including both the trash that is immediately reclaimed and the incineration ash from waste management facilities, is increasing annually. Consequently, much of this incineration ash, which is increasing annually, is being reclaimed and used on soil or being compacted in cement and discarded by each municipality, but it is difficult to guarantee a disposal site and this has become a significant social problem.

Furthermore, treatment of diatomaceous earth waste in industries that employ diatomaceous earth and treatment of the aluminum dross that is produced during smelting and refining in the field of aluminum smelting are industrial problems.

SUMMARY OF THE INVENTION

Consequently, the object has become to develop a method of producing artificial zeolite that is inexpensive and of uniform quality using as the starting material unused resources, such as descended pyroclastic materials, incineration ash, waste glass, waste diatomaceous earth, aluminum dross, etc.

The inventors performed various studies to accomplish this object and as a result, they were successful in presenting a method of producing artificial zeolite using an inorganic component comprising silicic acid and aluminum as the starting material. That is, the first of the present inventions is a method of producing artificial zeolite, characterized in that an inorganic component comprising silicic acid and aluminum is heat treated in the presence of water and an alkali. The preferred inorganic components containing silicic acid and aluminum are descended pyroclastic materials and incineration ash, and volcanic glass is particularly preferred as the descended pyroclastic materials. The preferred incineration ashes are incineration ash from combustible waste, the incineration ash from refuse-derived fuel, and coal ash. City trash and sludge are preferred examples of combustible waste. Sludge produced by dust removal during the process of recovering fibers after maceration of old paper (also called paper sludge) or activated sludge are particularly preferred. Sodium hydroxide and potassium hydroxide are the preferred alkalis, and an aqueous alkali solution is preferred for the water and alkali, with the ideal concentration being 2 to 4 N. Heat treatment should be performed at a temperature exceeding 100° C. particularly 120 to 230° C.

The second of the present inventions is a method of producing artificial zeolite, characterized in that a mixture that has been obtained by adding at least 1 or 2 or more of glass, diatomaceous earth and aluminum dross to an inorganic component comprising silicic acid and aluminum is heat treated in the presence of water and an alkali. The preferred inorganic components containing silicic acid and aluminum are descended pyroclastic materials and incineration ash, and volcanic glass is particularly preferred as the descended pyroclastic materials. The preferred incineration ashes are incineration ash from combustible waste, incineration ash from refuse-derived fuel, and coal ash. City trash and sludge are ideal examples of combustible waste. Sludge produced by dust removal during the process of recovering fibers after old paper has been macerated (also called paper sludge) or activated sludge are particularly preferred. Cullets of glass waste are the preferred glass. Sodium hydroxide and potassium hydroxide are the preferred alkalis, and an aqueous alkali solution is preferred for the water and alkali, with the ideal concentration being 2 to 4 N. Heat treatment should be performed at a temperature exceeding 100° C., particularly 120 to 230° C.

DESCRIPTION OF THE PREFERRED EMBODIMENTS

Figure 1:
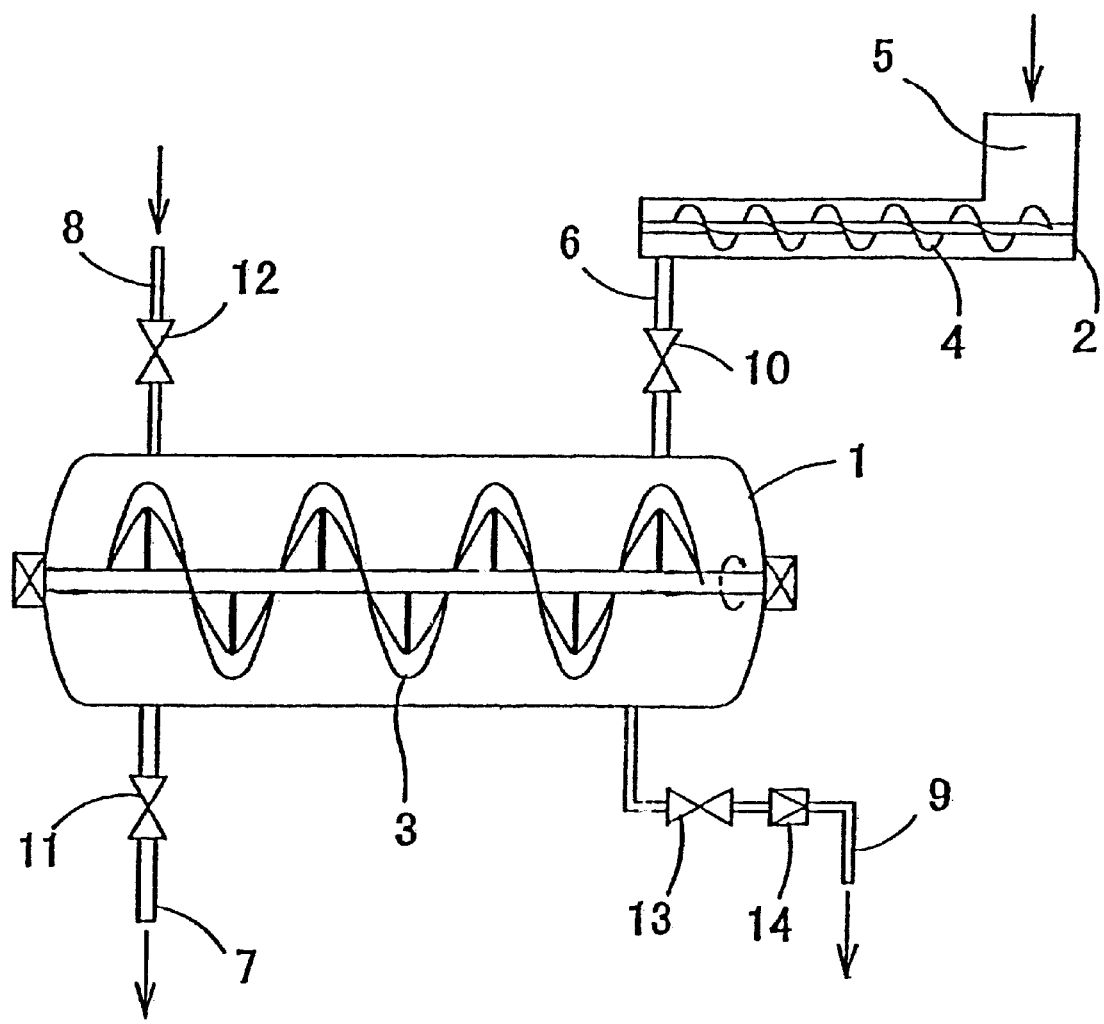
FIG. 1 is an example of the device for producing artificial zeolite with a pressure-resistant reaction vessel equipped with a mixer.

The artificial zeolite used in the present invention is zeolite that has been obtained by artificial conversion via alkali treatment of a composition comprising amorphous aluminum silicate consisting of an inorganic component comprising silicic acid and aluminum. The main component is phillipsite, faujasite, zeolite A, hydroxysodalite, etc., and it can also comprise traces of other components. Moreover, impurities such as organic matter, iron component, etc., intermediates leading up to zeolite, etc., can also be present as component other than zeolite, that is, non-zeolite component.

The term descended pyroclastic materials used in the present invention is the matter that settles after being sprayed from an active volcano and includes pumice, volcanic ash, etc. However, volcanic glass is preferred when executing the present invention. This volcanic glass is an amorphous natural glass made of small particles that have solidified before crystallization could proceed because of rapid cooling of molten lava in air.

The term incineration ash used in the present invention means incineration ash comprising silicic acid and aluminum as amorphous aluminum silicate and incineration ash from combustible waste, incineration ash from incineration with refuse-derived fuel as the heat source, coal ash, etc. The term combustible waste used here means waste that is produced by humans and that is combustible, and can be general waste or industrial waste. Combustible waste from wood, paper, etc., that is produced in civil engineering and construction, etc., are examples of the industrial waste. Moreover, the term city trash used in the present invention means of the combustible waste, fresh trash from homes as general waste and other combustible forms of trash. Furthermore, the term sludge used in the present invention means paper sludge that is produced by dust removal during the process of recovery of fibers after old paper has been macerated, and activated sludge that is produced by treatment of wastewater from the food industry and wastewater treatment in sewage-treatment plants. The sludge referred to as paper sludge also includes sludge produced by treatment with aqueous solutions of hydrogen peroxide, perchloric acid, perbromic acid, etc., to remove organic matter from sludge. The term refuse-derived fuel (RDF) used here means the product obtained when combustible waste is recovered from the waste produced by human activity, the combustible waste is crushed to a specific size, the crushed product is dried to a water content of 10%, coal is added in some cases, and the crushed waste is solidified. This fuel has a calorific value of approximately 2,000 to 3,000 kcal per 1 kg and is mainly used as fuel for power generation.

The term glass used in the present invention means silicate glass and typical examples are silicic acid glass, soda coal glass, potassium coal glass, lead glass, barium glass, borosilicic acid glass, etc. Moreover, challets that are the waste after using glass sheets, bottle glass, glass from food products, glass from household articles, glass used for electricity, lighting glass, glass used in science labs, glass used in medical equipment, optical glass, etc., can be employed. This further includes glass powder that is produced when glass products are crushed to recover the glass as waste. Glass is added and mixed with the descended pyroclastic materials, incineration ash, etc., in order to execute the present invention and therefore, the glass powder should be made from small particles.

The term diatomaceous earth used here is usually skeletons of diatoms, which are unicellular algae, that is, siliceous aggregates consisting of diatom grains, and mud, volcano ash, organic matter, etc., are usually mixed in this diatomaceous earth. It is a hydrous amorphous silicon dioxide. Diatomaceous earth is widely used in adsorption materials, filtration auxiliary materials, warm-insulating materials, cold-insulating materials, fillers, abrasive materials, etc. Depending on its use, crude diatomaceous earth is crushed and purified so that it can be used as needed. However, by means of the present invention, it is possible to start with diatomaceous earth used for various purposes and re-use the waste from this diatomaceous earth. For instance, diatomaceous earth waste that has been used as a filtration auxiliary material in the food industry for water treatment and purification of table sugar, starch syrup, soy sauce, sake, beer, syrups, vegetable oils, etc., in the chemical industry for purification of solvents, machine oils. petroleum, etc., in the fiber industry for purification of cellulose, rayon, etc., can be mentioned as an example.

The aluminum dross used in the present invention is dross, or aluminum oxide mixed with metallic aluminum during aluminum melting processes and covers the surface of the aluminum. It is formed when aluminum is melted for drawing and when aluminum is melted to make alloys, but its composition varies with the conditions under which it has been produced. The composition of aluminum dross that has been simply wiped off of a smelting furnace is for the most part metallic aluminum, with 15 to 40% being aluminum oxide. However, the composition of the aluminum dross produced in dross treatment facilities exceeds 50% aluminum oxide. However, there are no special restrictions to the composition of the aluminum dross in the present invention. In the past, aluminum dross was basically identified as an industrial waste. An effort was made to reduce the amount produced and to recover the metallic aluminum and its efficient use has been all but ignored.

The amount of glass, diatomaceous earth or aluminum dross used in the present invention depends on the silica:alumina ratio of the starting materials that will be used, that is, (the ratio by weight of $SiO_2$ and $Al_2O_3$)×1.7, and the type of zeolite that is to be produced. That is, the silica:alumina ratio of descended pyroclastic materials is approximately 3 to 4. Artificial zeolite that is obtained by heat treatment of descended pyroclastic materials as the starting material is a mixture of phillipsite and mordenite. The pore diameter of phillipsite is 0.4 to 0.5 nm and the pore diameter of mordenite is 0.6 to 0.7 nm. Cation exchange capacity of phillipsite is approximately 380 cmol (+) $kg^{-1}$ and that of mordenite is approximately 300 cmol (+) $kg^{-1}$. Therefore, this artificial zeolite has deodorizing capability. Moreover, the artificial zeolite obtained by heat treatment with an alkali of only incineration ash as the starting material is hydroxysodalite and its pore diameter is large and cation exchange capability is high, but it does not have deodorizing activity. Although the silica:alumina ratio can be increased by adding glass or diatomaceous earth to descended pyroclastic materials or incineration ash, the silica:alumina ratio decreases when aluminum dross is added to descended pyroclastic materials or incineration ash. For example, by adding 20 wt % or more of glass or diatomaceous earth in terms of the solid content of the incineration ash, the silica:alumina ratio is brought to 2 or higher and the ratio of phillipsite in the artificial zeolite that is obtained will be increased. Moreover, when 40 to 50 wt % glass or diatomaceous earth per incineration ash solid content is added to bring the silica:alumina ratio to 2.5 or higher, almost all of the artificial zeolite becomes phillipsite. Further, when the amount of glass or diatomaceous earth is increased and 60 wt % or more is added to bring the silica:alumina ratio to 4 or higher, the ratio of faujasite in the artificial zeolite increases. On the other hand, when aluminum dross is added to incineration ash and the silica:alumina ratio is reduced, the artificial zeolite that is obtained by heat treatment with an alkali will have a high hydroxysodalite content.

The term alkali used in the present invention means a hydroxide of an alkali metal that is soluble in water. Sodium hydroxide, potassium hydroxide, calcium hydroxide, barium hydroxide, lithium hydroxide, etc., can be given as examples. An aqueous alkali solution is preferred for the water and alkali because it is easy to handle when the present invention is performed and it is preferred that an aqueous solution of sodium hydroxide or of potassium hydroxide be employed. An aqueous 2 to 4 N sodium hydroxide solution is particularly preferred.

It was clear that with respect to the starting material for the artificial zeolite that is used in the present invention, the speed with which the amorphous aluminum silicate within the starting material particles will diffuse from these particles through the aqueous alkali solution is the rate-determining factor and the reaction between the alumina molecules and soluble silicate occurs at the particle surface and is dependent on the concentration of soluble silicate in the aqueous alkali solution. As a result, diffusion of the soluble silicate within the particle from the aluminum silicate and the solid phase reaction between the alumina and the soluble silicate at the particle surface are continuously performed in a single reaction bed and increasing the reaction temperature is an effective means of guaranteeing that artificial zeolite of a consistent quality will be obtained. The first step is to mix the starting materials and alkali in order to convert the aluminum silicate to zeolite, that is, to quickly remove the soluble silicate that has been produced from the starting material surface to promote diffusion of new alkali and thereby accomplish conversion to zeolite in a short amount of time, and the second step is to heat the mixture to induce a reaction with aluminum with the soluble silicate concentration being high.

The concentration of soluble silicate that will be dissolved in the aqueous alkali solution as the reaction whereby starting materials are converted to zeolite proceeds is adjusted by adjusting the amount of aqueous alkali solution that is mixed with the starting materials. Moreover, the concentration of alkali in the aqueous alkali solution can be adjusted by adjusting the alkali concentration in the reaction cell, and it is preferred that an aqueous 2 to 4 N sodium hydroxide solution be used. In addition, synthesis is normally performed in a pressure-resistant reaction vessel when saturated steam is employed to heat the system to 100° C. or higher. In this case, the reaction will smoothly proceed by keeping internal pressure of the reaction vessel at 2 to 30 kg/cm, that is, 120 to 230° C.

With respect to the heat treatment for executing the present invention, as previously mentioned, the reaction is usually performed in a pressure-resistant reaction vessel when saturated steam is employed, but it is also possible to heat the reaction vessel to the desired temperature under atmospheric pressure and further apply heat from the outside to satisfy the reaction conditions. A screw conveyor or kneader, etc., with a heater on the outside, and further, a rotating dryer that heats with warm air, etc., can be used for heating from the outside.

The present invention will be summarized. Descended pyroclastic materials, incineration ash, glass, diatomaceous earth or aluminum dross with a particle diameter of 20 to 100 $\mu$m can be used as is as the starting material for the artificial zeolite of the present invention, but it is necessary to crush any starting material that has a particle diameter larger than this range. For instance, when the incineration ash used in the present invention is coal fly ash or fly ash of incineration ash of combustible waste, such as city trash, this ash can be used as is for the starting material for the synthetic zeolite, but particle diameter is large when the incineration ash is incinerator ash and therefore, it must be crushed. In addition, particle diameter must be even smaller at less than 20 $\mu$m for some purposes.

A mixture of the abovementioned descended pyroclastic materials, incineration ash, glass, diatomaceous earth or aluminum dross is introduced to a reaction vessel as the starting material for the synthetic zeolite and water and an alkali are added. It is preferred that the starting materials and water and alkali be pre-mixed in this case in order to smoothly synthesize the zeolite in the reaction vessel. For example, as shown in FIG. 1, the starting materials, water and alkali are pre-mixed by screw conveyor 2 and starting material, water and alkali, etc., are fed through starting material feed inlet 6 to pressure-resistant reaction vessel 1 with a mixer attached and then temperature is increased with pressure by blowing saturated steam from steam inlet 8 into the reaction vessel. In this case, alkali is pre-added, and it can be used in the form of an aqueous solution or a solid. Water is fed by the steam and therefore, it is not always necessary to feed water with the starting materials. If the heating means is something other than saturated steam, for instance, if electric heat or hot air is used, the reaction vessel is not necessarily a pressure-resistant structure. In this case, alkali is pre-added, and it can be added as aqueous solution or a solid, but the water must be added as super-heated steam.

After the starting material has been introduced together with the alkali to pressure-resistant reaction vessel 1 with a mixer attached, saturated steam is applied from steam inlet 8 and the system is heated to a specific temperature in order to perform a zeolite-conversion reaction in the desired amount of time. Once the reaction has been completed, the steam is evacuated through stem outlet 9 using a let down valve and as a result, the inside of pressure-resistant reaction vessel 1 with a mixer attached is brought to normal pressure and reaction product in powdered form is obtained. The synthetic zeolite can be emitted through product outlet 7 and used without being washed. Next, the details of the present invention will be described with examples, but the gist of the present invention is not limited to these examples.

EXAMPLE 1

Volcanic glass from Kagoshima with a silica:alumina ratio of approximately 3.2 was crushed with a mortar and pestle and then 20 g were introduced with 200 ml aqueous 2N sodium hydroxide solution to a 1 L autoclave with a mixer attached (made to Toyo Koatsu Co., Ltd.). The lid was closed and then the system was heated to an internal temperature of 90° C. using saturated steam. Once this state had been maintained for 24 hours, the reaction product on the inside was recovered. The structure was confirmed by X-ray diffraction without rinsing the reaction product with water and as a result, it was found that phillipsite had been produced. The cation exchange capacity of this phillipsite was 420 cmol (+) kg$^{-1}$.

EXAMPLE 2

Volcanic glass from Kagoshima with a silica:alumina ratio of approximately 3.2 was crushed with a mortar and pestle and then 20 g were introduced with 200 ml aqueous 2N sodium hydroxide solution to a 1 L autoclave with a mixer attached (made to Toyo Koatsu Co., Ltd.). The lid was closed and then the system was pressurized and heated to an internal temperature of 200° C. using saturated steam. Once this state had been maintained for 2 hours, the steam was evacuated to return the system to atmospheric pressure and the reaction product on the inside was recovered. The structure was confirmed by X-ray diffraction without rinsing the reaction product with water and as a result, it was found that phillipsite had been produced. The cation exchange capacity of this phillipsite was 430 cmol (+) kg$^{-1}$.

EXAMPLE 3

Twenty grams incineration ash (from Machida Waste Management Incinerators, Tokyo-to) with an amorphous aluminum silicate content of 80% and a silica:alumina ratio of approximately 2.0 were introduced with 200 ml aqueous 2N sodium hydroxide solution to a 1 L autoclave with a mixer attached (made to Toyo Koatsu Co., Ltd.). The lid was closed and then the system was heated to an internal temperature of 90° C. Once this state had been maintained for 24 hours, the reaction product on the inside was recovered. The structure was confirmed by X-ray diffraction without rinsing the reaction product with water and as a result, it was found that hydroxysodalite had been produced. The cation exchange capacity of this hydroxysodalite was 270 cmol (+) kg$^{-1}$.

EXAMPLE 4

Twenty grams incineration ash (from Machida Waste Management Incinerators, Tokyo-to) with an amorphous aluminum silicate content of 80% and a silica:alumina ratio of approximately 2.0 were introduced with 200 ml aqueous 4N sodium hydroxide solution to a 1 L autoclave with a mixer attached (made to Toyo Koatsu Co., Ltd.). The lid was closed and then the system was pressurized and heated to an internal temperature of 120° C. using saturated steam. Once this state had been maintained for 10 hours, the steam was evacuated to return the system to atmospheric pressure and the reaction product on the inside was recovered. The structure was confirmed by X-ray diffraction without rinsing the reaction product with water and as a result, it was found that hydroxysodalite had been produced. The cation exchange capacity of this hydroxysodalite was 400 cmol (+) kg$^{-1}$.

EXAMPLE 5

Twenty grams incineration ash (from Machida Waste Management Incinerators, Tokyo-to) with an amorphous aluminum silicate content of 80% and a silica:alumina ratio of approximately 2.0 were introduced with 200 ml aqueous 4N sodium hydroxide solution to a 1 L autoclave with a mixer attached (made to Toyo Koatsu Co., Ltd.). The lid was closed and then the system was pressurized and heated to an internal temperature of 200° C. using saturated steam. Once this state had been maintained for 3 hours, the steam was evacuated to return the system to atmospheric pressure and the reaction product on the inside was recovered. The structure was confirmed by X-ray diffraction without rinsing the reaction product with water and as a result, it was found that hydroxysodalite had been produced. The cation exchange capacity of this hydroxysodalite was 60001 (+) kg$^{-1}$.

EXAMPLE 6

Twenty grams fly ash (from the Matsuura Generator of Dengen Kaihatsu; provided by the obtained from Fly Ash Association of Japan) with an amorphous aluminum silicate content of 95% and a silica:alumina ratio of approximately 2.5 were introduced with 200 ml aqueous 4N sodium hydroxide solution to a 1 L autoclave with a mixer attached (made to Toyo Koatsu Co., Ltd.). The lid was closed and then the system was pressurized and heated to an internal temperature of 120° C. with saturated steam. Once this state had been maintained for 10 hours, the steam was evacuated to return the system to atmospheric pressure and the reaction product on the inside was recovered. The structure was confirmed by X-ray diffraction without rinsing the reaction product with water and as a result, it was found that phillipsite had been produced. The cation exchange capacity of this phillipsite was 350 cmol (+) kg$^{-1}$.

EXAMPLE 7

Twenty grams fly ash (from Matsuura Generator of Dengen Kaihatsu; provided by the Fly Ash Association of Japan) with an amorphous aluminum silicate content of 95% and a silica:alumina ratio of approximately 2.5 were introduced with 200 ml aqueous 4N sodium hydroxide solution to a 1 L autoclave with a mixer attached (made to Toyo Koatsu Co., Ltd.). The lid was closed and then the system was pressurized and heated to an internal temperature of 200° C. with saturated steam. Once this state had been maintained for 3 hours, the steam was evacuated to bring the system to atmospheric pressure and the reaction product on the inside was recovered. The structure was confirmed by X-ray diffraction without rinsing the reaction product with water and as a result, it was found that phillipsite had been produced. The cation exchange capacity of this phillipsite was 400 cmol (+) kg$^{-1}$.

EXAMPLE 8

One-hundred grams incineration ash from refuse-derived fuel (from MachidaWaste Management Incineratorsi, Tokyo-to) were obtained and introduced to a 1 liter Erlenmeyer flask. Then 240 ml aqueous 3.5 N sodium hydroxide solution were added to this. A reflux condenser tube was attached to this Erlenmeyer flask and a mixture in slurry form was heated at 80 to 90° C. over a hot plate and reacted for 60 hours. Once the reaction was over, the excess sodium hydroxide was washed with water and air dried to obtain a powder. It was confirmed from the X-ray diffraction pattern that hydroxysodallte was produced as the synthetic zeolite. The cation exchange capacity of this reaction product was 410 cmol (+) kg$^{-1}$.

EXAMPLE 9)

One-hundred grams incineration ash from refuse-derived fuel ( from Machida Waste Management Incinerators, Tokyo-to) were obtained and introduced to a 1 liter Erlenmeyer flask. Then 240 ml aqueous 3.5 N sodium hydroxide solution were added to this. The Erlenmeyer tube was then introduced to a pressure-resistant vessel and heated to 120 to 125° C. with saturated steam and reacted for 10 hours. Once the reaction was over, the excess sodium hydroxide was washed with water and air dried to obtain a powder. It was confirmed from the X-ray diffraction pattern that hydroxysodalite was produced as the synthetic zeolite. The cation exchange capacity of this reaction product was 400 cmol (+) Kg$^1$.

EXAMPLE 10

Volcanic glass from Kagoshima with a silica:alumina ratio of approximately 3.2 was crushed with a mortar and pestle and then 20 g of this were introduced with 5 g glass powder (West Japan Environmental Development Cooperative) to a 1 L autoclave with a mixer attached (made by Toyo Koatsu Co., Ltd.). Then 200 ml aqueous 2N sodium hydroxide solution were introduced over this and the lid was closed. Next, the system was heated with saturated steam until the internal temperature reached 90° C. Once this state had been maintained for 24 hours, the reaction product inside was recovered. The structure was confirmed by X-ray diffraction without rinsing the reaction product with water and it was found that faujasite had been produced. The cation exchange capacity of the faujasite was 290 cmol (+) $kg^{-1}$.

EXAMPLE 11

Volcanic glass from Kagoshima with a silica:alumina ratio of approximately 3.2 was crushed with a mortar and pestle and then 20 g of this were introduced with 5 g aluminum dross (provided by the Light Metal Association of Japan) to a 1 L autoclave with a mixer attached (made by Toyo Koatsu Co., Ltd.). Then 200 ml aqueous 2N sodium hydroxide solution were introduced over this and the lid was closed. Next, the system was heated with saturated steam until the internal temperature reached 90° C. Once this state had been maintained for 24 hours, the reaction product inside was recovered. The structure was confirmed by X-ray diffraction without rinsing the reaction product with water and it was found that phillipsite had been produced. The cation exchange capacity of the phillipsite was 410 cmol (+) $kg^{-}$.

EXAMPLE 12

Twenty grams incineration ash from city trash (from Machida Waste Management Incinerators, Tokyo) with an amorphous aluminum silicate content of 80% and a silica:alumina ratio of approximately 2.0 and 10 g glass powder (West Japan Environmental Development Cooperative) were thoroughly mixed and introduced to a 1 liter Erlenmeyer flask. Then 240 ml aqueous 3.5 N sodium hydroxide solution were added to this. A reflux condenser was attached to this Erlenmeyer flask and the mixture in slurry form was heated at 80 to 90° C. over a hot plate and reacted for 60 hours. Once the reaction was over, the excess sodium hydroxide was washed with water and rinsed with a 0.5 M magnesium chloride solution and then re-rinsed with water and air dried to obtain a powder. It was found from the X-ray diffraction pattern that phillipsite had been produced as the artificial zeolite. The cation exchange capacity of this phillipsite was 380 cmol (+) $kg^{-1}$.

EXAMPLE 13

Twenty grams incineration ash from city trash (from Machida Waste Management Incinerators, Tokyo) with an amorphous aluminum silicate content of 80% and a silica:alumina ratio of approximately 2.0 and 20 g glass powder (West Japan Environmental Development Cooperative) were thoroughly mixed and introduced to a 1 liter Erlenmeyer flask. Then 240 ml aqueous 3.5 N sodium hydroxide solution were added to this. A reflux condenser was attached to this Erlenmeyer flask and the mixture in slurry form was heated at 80 to 90° C. over a hot plate and reacted for 60 hours. Once the reaction was over, the excess sodium hydroxide was washed with water and rinsed with a 0.5 M magnesium chloride solution and then re-rinsed with water and air dried to obtain a powder. It was found from the X-ray diffraction pattern that faujasite had been produced as the artificial zeolite. The cation exchange capacity of this faujasite was 250 cmol (+) $kg^{-1}$.

EXAMPLE 14

Twenty grams incineration ash from city trash (from Machida Waste Management Incinerators, Tokyo) with an amorphous aluminum silicate content of 80% and a silica:alumina ratio of approximately 2.0 and 5 g glass powder (from West Japan Environmental Development Cooperative) were thoroughly mixed and introduced to a 1 L autoclave with a mixer attached (made by Toyo Koatsu Co., Ltd.). The silica:alumina ratio was brought to approximately 2.5 and then 200 ml aqueous 4 N sodium hydroxide solution were added to this. The lid was closed and the system was pressurized and heated to an internal temperature of 120° C. with saturated steam. Once this state had been maintained for 10 hours, the steam was evacuated to bring the system to atmospheric pressure and the reaction product inside was recovered. The structure was confirmed by X-ray diffraction without rinsing the reaction product was water and it was found that phillipsite had been produced as the artificial zeolite. The cation exchange capacity of this phillipsite was 350 cmol $(+)kg^{-1}$.

EXAMPLE 15

Twenty grams fly ash from city trash (from Matsuura Generator, Dengen Kaihatsu Co., Ltd., provided by the Fly Ash Association of Japan) with an amorphous aluminum silicate content of 95% and a silica:alumina ratio of approximately 2.5 and 10 g glass powder (West Japan Environmental Development Cooperative) were thoroughly mixed and introduced to a 1 L Erlenymer flask. Then 240 ml aqueous 3.5 N sodium hydroxide solution were added to this. A reflux condenser was attached to this Erlenmeyer flask and the mixture in slurry form was heated at 80 to 90° C. over a hot plate and reacted for 60 hours. Once the reaction was over, the excess sodium hydroxide was washed with water and rinsed with a 0.5 M magnesium chloride solution. It was re-rinsed with water and air dried to obtain a powder. It was found from the X-ray diffraction pattern that faujasite had been produced as the artificial zeolite. The cation exchange capacity of this faujasite was 380 cmol (+) $kg^{-1}$.

EXAMPLE 16

Twenty grams fly ash from city trash (from Matsuura Generator, Dengen KaThatsu Co., Ltd., provided by the Fly Ash Association of Japan) with an amorphous aluminum silicate content of 95% and a silica:alumina ratio of approximately 2.5 and 5 g glass powder (West Japan Environmental Development Cooperative) were thoroughly mixed and introduced to a 1 L autoclave with a mixer attached (Toyo Koatsu Co., Ltd.) and the silica:alumina ratio was brought to approximately 4. Then 200 ml aqueous 4 N sodium hydroxide solution was introduced over this and the lid was closed. The system was pressurized and heated to an internal temperature of 120° C. using saturated steam. Once this state had been maintained for 5 hours, the steam was evacuated and the system was brought to atmospheric pressure. The reaction product inside was recovered. The structure was confirmed by X-ray diffraction without washing the reaction product with water and it was found that faujasite had been produced. The cation exchange capacity of this faujasite was 320 cmol (+) $kg^1$.

EXAMPLE 17

Twenty grams fly ash from city trash (from Matsuura Generator, Dengen Kaihatsu Co., Ltd., provided by the Fly Ash Association of Japan) with an amorphous aluminum silicate content of 95% and a silica:alumina ratio of approximately 2.5 and 5 g glass powder (Western Japan. Environmental Development Cooperative) were introduced to a 1 L autoclave with a mixer attached (Toyo Koatsu Co., Ltd.) and the silica:alumina ratio was brought to approximately 4. Then 200 ml aqueous 4 N sodium hydroxide solution were introduced over this and the lid was closed. The system was pressurized and heated to an internal temperature of 200° C. using saturated steam. Once this state had been maintained for 3 hours, the steam was evacuated and the system was brought to atmospheric pressure. The reaction product Inside was recovered. The structure wa s confirmed by X-ray diffraction without washing the reaction product with water and it was found that faujasite had been produced. The cation exchange capacity of this faujasite was 300 cmol (+) kg.$^{-1}$.

EXAMPLE 18

Twenty grams fly ash from city trash (from Matsuura Generator, Dengen Kaihatsu Co., Ltd., provided by the Fly Ash Association of Japan) with an amorphous aluminum silicate content of 95% and a silica:alumina ratio of approximately 2.5 and 5 g aluminum dross (provided by the Light Metal Association of Japan) were introduced to a 1 L autoclave with a mixer attached (Toyo Koatsu Co., Ltd.) and the silica:alumina ratio was brought to approximately 2. Then 200 ml aqueous 4 N sodium hydroxide solution were introduced over this and the lid was closed. The system was pressurized and heated to an internal temperature of 120° C. using saturated steam. Once this state had been maintained for 5 hours, the steam was evacuated to bring the system to atmospheric pressure and the reaction product inside was recovered. The structure was confirmed by X-ray diffraction without washing the reaction product with water and it was found that hydroxysodalite had been produced. The cation exchange capacity of this hydroxysodalite was

EXAMPLE 19

Fifty g glass powder (Western Japan Environmental Development Cooperative) were added to 50 g incineration ash from refuse-derived fuel (from Machida Waste Management Incinerators, Tokyo) and introduced to a 1 liter Erlenmeyer flask. Then 240 ml aqueous 3.5 N sodium hydroxide solution were added to this. A reflux condenser was attached to this Erlenmeyer flask and the mixture in slurry form was heated over a hot plate at 90 to 95° C. and reacted for 24 hours. Once the reaction was completed, the excess sodium hydroxide was washed with water and air dried to obtain a powder. It was found from the X-ray diffraction pattern that phillipsite had been produced as the artificial zeolite. The cation exchange capacity of this phillipsite was 400 cmol (+) kg$^{-1}$.

EXAMPLE 20

Seventy grams diatomaceous earth (from Kyorin Brewery) were added to 30 g incineration ash from refuse-driven fuel (from Machida Waste Management, Tokyo-to) and introduced to a 1 liter Erlenmeyer flask. Then 240 ml aqueous 3.5 N sodium hydroxide solution were added to this. A ref lux condenser tube was attached to this Erlenmeyer flask and the mixture in slurry form was heated over a hot plate at 90 to 95° C. and reacted for 24 hours. Once the reaction was over, the excess sodium hydroxide was washed with water and air dried to obtain a powder. It was found from the X-ray diffraction pattern that phillipsite had been produced as the artificial zeolite. The cation exchange capacity of this phillipsite was 340 cmol (+) kg$^{-1}$.

Zeolite has a variety of different uses depending on the quality of the zeolite, whether it is natural or synthetic. Moreover, artificial zeolite can be inexpensively produced in comparison to synthetic zeolite, and it has better quality than natural zeolite.

The present invention is a method of producing artificial zeolite using as the starting material unused resources, including descended pyroclastic materials, incineration ash of combustible waste, incineration ash of sludge, coal ash, incineration ash of refuse-driven fuel, etc., as the inorganic component comprising silicic acid and aluminum. Moreover, it is a method of producing artificial zeolite of any quality as needed for the purpose of use whereby industrial waste, such as glass, diatomaceous earth, aluminum dross, etc., can be added to adjust the silica:alumina ratio of the starting material as needed.

What is claimed is:

1. A method of producing artificial zeolite, wherein heat treatment is performed in an alkali solution on a mixture obtained by adding at least one of cullets of glass waste, diatomaceous earth and aluminum dross to incineration ash of combustible waste.

2. A method of producing artificial zeolite according to claim 1, wherein the combustible waste is city waste.

3. A method of producing artificial zeolite according to claim 1, wherein the combustible waste is sludge.

4. A method of producing artificial zeolite according to claim 3, wherein the sludge is sludge that is produced by dust removal during the process of recovering fibers after paper has been macerated.

5. A method of producing artificial zeolite according to claim 3, wherein the sludge is activated sludge produced by wastewater treatment.

6. A method of producing artificial zeolite, wherein heat treatment is performed in an alkali solution on a mixture obtained by adding at least one of cullets of glass waste, diatomaceous earth and aluminum dross to incineration ash of refuse-derived fuel.

7. A method of producing artificial zeolite according to any one of claims 1, or 6, wherein the alkali solution is sodium hydroxide solution or potassium hydroxide solution.

8. A method of producing artificial zeolite according to any one of claims 1, or 6, wherein the concentration of the alkali solution is 2 to 4N.

9. A method of producing artificial zeolite according to any one of claims 1, or 6, wherein the heat treatment is performed at a temperature between 120 and 230° C.

* * * * *